(No Model.)
A. C. G. DUPUIS.
SPIKE.
No. 593,880. Patented Nov. 16, 1897.
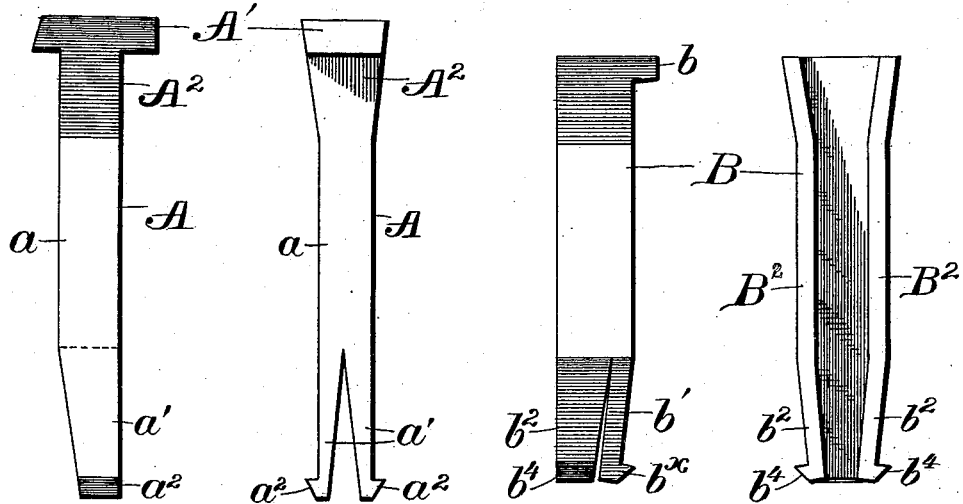
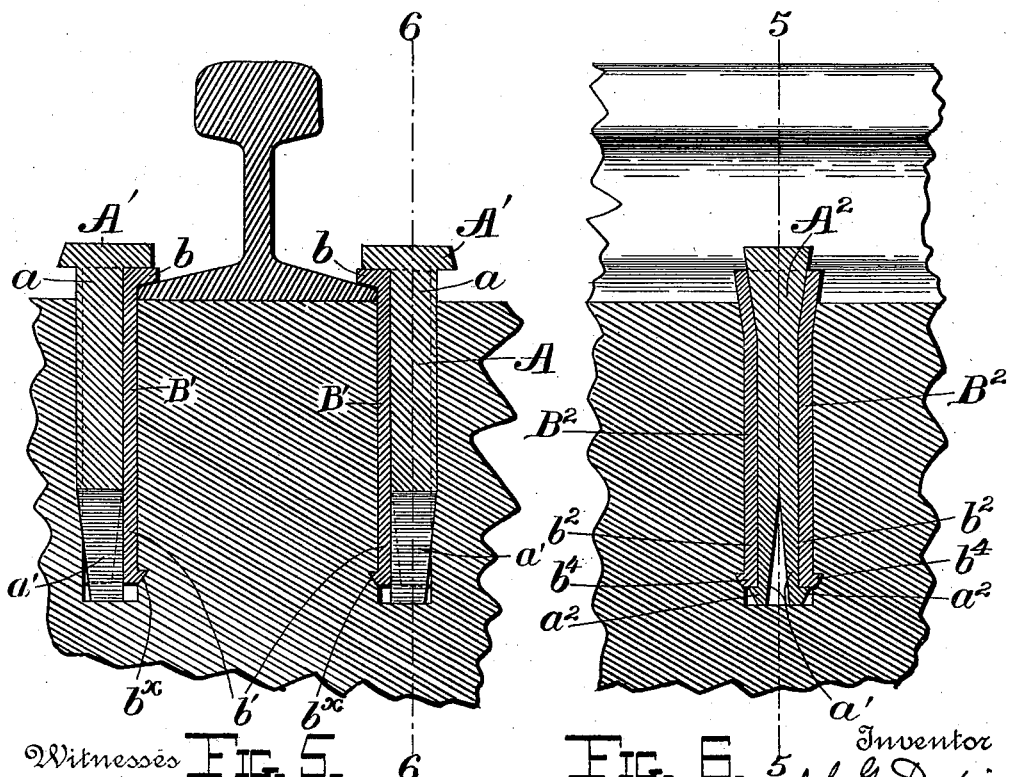
Witnesses
Percy C. Bowen
John C. Wilson
Inventor
A. C. G. Dupuis
by Whitman & Wilkinson
Attorneys

UNITED STATES PATENT OFFICE.

ADOLPHE CHARLES GHISLAIN DUPUIS, OF NEW ORLEANS, LOUISIANA.

SPIKE.

SPECIFICATION forming part of Letters Patent No. 593,880, dated November 16, 1897.

Application filed July 24, 1896. Serial No. 600,428. (No model.)

*To all whom it may concern:*

Be it known that I, ADOLPHE CHARLES GHISLAIN DUPUIS, a subject of the King of Belgium, (having declared my intention to become a citizen of the United States,) residing at New Orleans, in the parish of Orleans and State of Louisiana, have invented a new and useful Spike, of which the following is a specification.

My invention relates to improvements in spikes adapted for use more particularly in binding rails upon cross-ties in the construction of railroads; and it consists in the novel devices hereinafter described and claimed.

My invention will be understood by reference to the accompanying drawings, wherein the same parts are indicated by the same letters throughout the several views.

Figure 1 represents a side elevation of the spike, and Fig. 2 represents a front elevation of the same. Fig. 3 represents a side elevation of the sheathing for locking the spike in the cross-tie, and Fig. 4 represents a front elevation of the same. Fig. 5 represents a vertical section through a railroad cross-tie and spike, taken on the line 5 5 in Fig. 6; and Fig. 6 is a vertical section taken through a railroad cross-tie and spike of my construction, taken on the line 6 6 in Fig. 5.

A represents the spike proper, which is provided with a flanged head A' and enlarged portion $A^2$ adjacent thereto. The body portion $a$ of the spike is of a uniform size, preferably, throughout its length, and the point thereof is bifurcated, forming a pair of similar legs $a'$ $a'$, each of which is provided with a barb or spur $a^2$ on its extreme lower end, which extends outwardly therefrom, as shown. The outer face of the legs $a'$ is preferably beveled slightly, as shown in Fig. 1, and the barbs or spurs $a^2$ thereon are also beveled somewhat in order that the spike may be more readily driven into place.

B represents the sheathing, which is used for locking the spike in position and which is first inserted into a hole previously bored into the cross-tie for its reception and then has the spike driven home therein. This sheathing is composed, preferably, of sheet metal, and comprises the back member B' and the two similar side members $B^2$ $B^2$. The back member B' is provided with a rearwardly-extending flange $b$ at its upper end and with a spring leg or foot $b'$ at its lower end, having a barb or spur $b^\times$ thereon. The side members $B^2$ preferably diverge at their upper ends to admit the enlarged portion $A^2$ of the spike and terminate at their lower ends in a pair of spring legs or feet $b^2$, which are provided with outwardly-extending beveled barbs or spurs $b^4$, as shown most clearly in Figs. 4 and 6. Before the spike is driven into the sheathing the three spring-legs $b'$ and $b^2 b^2$ converge toward each other, as shown in Figs. 3 and 4, but when the spike is driven into place the said legs are forced apart and the barbs or spurs $b^\times$ and $b^4$ $b^4$ thereon are forced into the wood of the tie, at the sides of the hole therein, as seen in Figs. 5 and 6.

When the spike is driven into the sheathing, the diverging portions of the side members $B^2$ of the sheathing will allow the spike to be started, and as the latter is driven down the legs $a'$ $a'$ will be sprung inward toward each other until the barbs or spurs $a^2$ thereon pass the lower ends of the legs $b^2$ $b^2$ of the side members of the sheathing, when the said legs $a'$ will spring outward and the spurs thereon will engage beneath the ends of the legs $b^2$, as shown in Fig. 6, the spike being just enough longer than the sheathing to allow this to occur. It will also be seen that as the spike is driven downward the legs $b^2$ on the sheathing will be forced apart and the spurs $b^4$ thereon will be forced into the wood of the tie, as will also the leg $b'$ be forced outward, by the inner straight edge of the spike, as shown.

The spike should preferably be beveled slightly upon its outer face at the lower end, so as to create a wedge effect when being driven home.

In practice a hole is first bored or otherwise made in the tie or other timber, and then a wood-preserving compound is poured into this hole, and afterward the sheathing B and the spike A are inserted and driven home, as above described.

The flange $b$ at the top of the back member of the sheathing rests upon the flange of the rail and the inner flange on the head of the spike rests upon the flange $b$, so that the parts will coöperate to hold each other firmly and securely in place.

Having thus described my invention, what I claim, and desire to secure by Letters Patent of the United States, is—

1. The combination with a sheathing comprising a back member having a flanged upper end; and a pair of similar side members terminating at their lower ends in a pair of converging legs provided with a pair of oppositely-disposed barbs or spurs thereon; of a spike having a flanged head and having a bifurcated spring-point provided with a pair of oppositely-disposed barbs or spurs thereon, adapted to force the said legs on the sheathing outward as the spike is driven into said sheathing, and to engage beneath the ends of said legs after passing said ends, substantially as described.

2. The combination with a sheathing comprising a back member having a flanged upper end and terminating at its lower end in a leg provided with an outwardly-disposed barb or spur; and a pair of similar side members terminating at their lower ends in a pair of converging legs provided with a pair of oppositely-disposed barbs or spurs thereon; of a spike having a flanged head, and having a bifurcated spring-point provided with a pair of oppositely-disposed barbs or spurs thereon, adapted to force the said legs on the sheathing outward as the spike is driven into said sheathing, and to engage beneath the ends of said legs after passing said ends, substantially as described.

3. The combination with a sheathing having a flange at one side of its top, and having a plurality of spring-legs at its lower ends provided with outwardly-disposed barbs or spurs thereon; of a spike having a point provided with a plurality of spring-legs having outwardly-disposed barbs or spurs thereon, the said spike being adapted to be driven into said sheathing and to force the legs on said sheathing apart, and the barbs or spurs on said spike being adapted to engage beneath the lower ends of the legs on said sheathing after passing said ends, substantially as described.

4. The combination with the sheathing B comprising the back member B' having flange $b$ at its upper end and terminating at its lower end in a bent spring-leg $b'$ having spur $b^\times$ thereon, and the side members $B^2$ in the bent spring-legs $b^2 b^2$ having oppositely-disposed spurs $b^4 b^4$ thereon; of the spike A having flanged head A' and having the pair of similar spring-legs $a'$ A' at its point provided with oppositely-disposed spurs $a^2 a^2$ thereon, the said spike being adapted to be driven into said sheathing and to lock the same in the cross-tie, and said sheathing being adapted to lock the said spike in position, substantially as and for the purposes described.

ADOLPHE CHARLES GHISLAIN DUPUIS.

Witnesses:
VICTOR HUET,
BENJAMIN BALLON.